United States Patent [19]

von Bonin

[11] Patent Number: 4,857,364
[45] Date of Patent: Aug. 15, 1989

[54] INTUMESCENT COMPOSITIONS AND THE USE THEREOF

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 132,513

[22] Filed: Dec. 14, 1987

[30] Foreign Application Priority Data

Dec. 20, 1986 [DE] Fed. Rep. of Germany ....... 3643708

[51] Int. Cl.$^4$ .............................................. C08G 18/28
[52] U.S. Cl. .................... 427/255; 427/255.6; 427/372.2; 427/374.1; 427/388.2; 427/389.7; 427/393; 428/425.1; 428/425.5; 428/425.6; 428/425.8; 528/72; 524/875
[58] Field of Search .......................... 528/72; 524/875; 427/255, 255.6, 372.2, 374.1, 388.2, 389.7, 393; 428/425.1, 425.5, 425.6, 425.8

[56] References Cited

U.S. PATENT DOCUMENTS

| | | | |
|---|---|---|---|
| 3,385,914 | 5/1968 | Hindersinn et al. | 260/944 |
| 4,202,946 | 5/1980 | Smith et al. | 521/169 |
| 4,367,295 | 1/1983 | von Bonin | 521/165 |
| 4,380,593 | 4/1983 | von Bonin et al. | 521/163 |
| 4,529,742 | 7/1985 | von Bonin et al. | 521/107 |
| 4,555,562 | 11/1985 | Lee et al. | 528/72 |

FOREIGN PATENT DOCUMENTS 0217080 8/1986 European Pat. Off. .
3302417 7/1984 Fed. Rep. of Germany .
3306698 8/1984 Fed. Rep. of Germany .

OTHER PUBLICATIONS

Chemical Abstracts, Band 100, Nr. 22, Mai 1984, Seite 68, Zusammenfassung Nr. 176253 g, Columbus Ohio, U.S.
JP-A-58 225 116 (Hitachi Cable Ltd) 12-27-1983.

*Primary Examiner*—Maurice J. Welsh
*Assistant Examiner*—L. Henderson
*Attorney, Agent, or Firm*—Sprung Horn Kramer & Woods

[57] ABSTRACT

The intumescent compositions according to the invention are reaction mixtures which are obtained on mixing and reacting the following components:
 (A) specific polyether polyols,
 (B) specific polyester polyols,
 (C) specific phosphorus-containing polyols,
 (D) inert desiccants,
 (E) dehydratable fillers,
 (F) other inorganic auxiliaries and fillers,
 (G) catalysts and
 (H) polyisocyanates.

7 Claims, No Drawings

INTUMESCENT COMPOSITIONS AND THE USE THEREOF

The invention relates to new, propellent-free intumescent compositions based on polyurethane which have improved properties relating to fire, and to the use of these compositions as coating materials and for the preparation of moulded articles having a protective action against fire and heat.

Intumescent compositions are taken to mean those compositions which foam under the action of fire and heat, forming an insulating and fire-retardant foam which protects the regions under the foam against the action of fire. Intumescent compositions based on polyurethane, i.e. based on products of the reaction of polyisocyanates and those compounds which have hydrogen atoms which are capable of reacting with isocyanate groups, for example polyetherols or polyesterols, have been disclosed (see, for example, DE-OS (German Published Specifications) No. 3,025,217, 3,041,731, 3,025,309, 3,109,352, 3,235,571, 3,302,417, 3,306,698 and 3,411,327). These known intumescent compositions based on polyurethane are reaction mixtures for whose preparation, apart from products of the reaction of polyisocyanates with phosphorus-containing polyols and, if appropriate, phosphorus-free polyether or polyester polyols, derivatives or salts of cyanuric acid and/or melamine or aromatic hydroxycarboxylic acids are also used - as propellents.

These known reaction mixtures are distinguished by excellent intumescent properties and a good flame-retardant behaviour. However, it has been shown that the fireproofing action of these known reaction mixtures is still inadequate under particularly difficult conditions, for example under the conditions of a hydrocarbon fire in which the objects are simultaneously subjected to the influences of high temperatures (1000° C. and above) and the flame erosion action of the fire for fire durations of 30 to 120 minutes.

Surprisingly, it has been found that intumescent compositions having a fireproofing effect which is substantially improved compared to intumescent compositions containing propellents are obtained when no propellents such as the derivatives or salts of cyanuric acid and/or of melamine or of aromatic hydroxycarboxylic acids are used for the preparation of the reaction mixture, but instead of these, it is ensured, by choice of suitable components for the polyisocyanate/polyol reaction product and suitable inorganic mixture components, that a substantially pore-free intumescent composition is produced. This is because it has surprisingly been found, in addition, that the protective action of the intumescent compositions is greater the lower its porosity. It has been found that, contrary to the assumption that the protective action increases with increasing porosity (=decreasing heat conductivity) of the intumescent compositions, the protective action surprisingly increases with decreasing porosity of the intumescent composition. It has furthermore been found that intumescent compositions having particularly improved intumescent behaviour are obtained using certain combinations of polyether polyols and polyester polyols.

Using the propellent-free reaction mixtures according to the invention made from products of the reaction of polyisocyanates with phosphorus-containing and phosphorus-free polyols and inorganic additives, intumescent compositions are obtained which have a substantially improved fireproofing effect under conditions of hydrocarbon fire. Under the action of flames, they form a substantially crack-free, solid, fine-porous, resistant intumescent foam which is distinguished by a very good insulating action and a high flame erosion resistance. The water-containing fillers contained in the intumescent composition are incorporated in this foam in dehydrated form. In this, they contribute partly through ceramization, to the formation of an oxidation-stable, relatively solid protective layer for the substrates which are coated or are to be protected, for example steel beams, oil or gas tanks, pipelines etc.

In addition to the substantially improved protective action against fire and heat, the intumescent compositions according to the invention have the important further advantage that they contain only polymers and water-insoluble inorganic components and are therefore to a large extent waterproof and weatherproof.

The invention therefore relates to new, propellent-free intumescent compositions based on products of the reaction of phosphorus-containing and phosphorus-free polyols and polyisocyanates, which are characterized in that they are a reaction mixture produced on mixing and reacting the following components, from:

(A) 5 to 25 % by weight, preferably 7 to 17 % by weight, relative to the total weight of components A to G, of a polyether polyol containing at least 1.75 OH groups per molecule and having an OH number from 150 to 400;

(B) 5 to 35 % by weight, preferably 15 to 25 % by weight, relative to the total weight of components A to G, of a polyester polyol containing at least 2 OH groups per molecule and having an OH number from 150 to 400;

(C) 5 to 25 % by weight, preferably 5 to 15 % by weight, relative to the total weight of components A to G, of a phosphorus-containing polyol containing at least two OH groups per molecule and having a phosphorus content between 6 and 21 % by weight, preferably between 10 and 15 % by weight, with the proviso that the total weight of components A+B+C makes up 15 to 70 % by weight, preferably 30 to 45 % by weight, of the total weight of the reaction mixture;

(D) 0 to 10 % by weight, preferably 0.5 to 5 % by weight, relative to the total weight of components A to G, of an inert desiccant;

(E) 20 to 85 % by weight, preferably 40 to 55 % by weight, relative to the total weight of the reaction mixture, of a dehydratable filler;

(F) 0 to 30 % by weight, preferably 0 to 12 % by weight, relative to the total weight of the reaction mixture of other inorganic auxiliaries and fillers, with the proviso that the total weight of components D+E+F is 20 to 90 % by weight, preferably 45 to 70 % by weight, relative to the total weight of the reaction mixture; and (G) 0 to 3 % by weight, preferably 0 to 1.5 % by weight, relative to the total weight of components A+B+C of a catalyst; and (H) 70 to 130 % by weight, preferably 95 to 115 % by weight, relative to the amount which is stoichiometrically necessary for reaction of the active hydrogen atoms contained in the mixture of components A, B and C, of a polyisocyanate.

The proportion of component C in the total weight of components A+B+C is generally 10 to 65 % by weight, preferably 20 to 50 % by weight.

As component (A), those polyether polyols which contain an average of 1.75 to 6 OH groups per molecule and have an OH number of 150 to 300 and in which the proportion of ethylene oxide units in the molecule is more than 65 % by weight are preferably employed.

As component (B), polyester polyols which are based on adipic acid and which contain an average of about 1.75 to 6 OH groups per molecule and have OH numbers from 120 to 400 are preferably employed.

As component (C), phosphorus-containing condensation products of the formula $$(RO)_2PO\text{-}CH_2\text{-}N(CHX\text{-}CHX_1\text{-}OH)_2 \quad (1)$$

in which
R represents $C_1$–$C_8$-alkyl or $C_1$–$C_8$-hydroxyalkyl and
X and $X_1$, independently of one another, represent hydrogen or methyl,
are preferably employed.

In formula (1), R preferably represents ethyl or hydroxyethyl and X and $X_1$ preferably represent hydrogen.

As component (D), minerals which are capable of binding water, in particular synthetic silicates of the zeolite type, are preferably employed.

As component (E), aluminium hydroxides or oxide hydrates which have a grain size >5 μm and/or a BET surface area <5 $m^2$/g are preferably used.

As component (F), sedimentation inhibitors, in particular silicas, silicates and/or coloured pigments on an inorganic basis and/or organic fillers, but in particular inorganic fillers which contribute to ceramization under the influence of flames are preferably used.

As component (G), basic catalysts which are known in polyurethane chemistry, particularly organometallic catalysts, particularly preferably organotin catalysts, are preferably used.

As component (H), industrial aromatic polyisocyanates of the diisocyanatodiphenylmethane (MDI) type, as are obtained on phosgenation of aniline-formaldehyde condensation products, are preferably employed.

Representatives which may be mentioned of polyether polyols to be used as component (A) are, for example, alkoxylation products obtained through the addition reaction of alkylene oxides which consist of 50 to 100 % by weight of ethylene oxide with Zerewitinoff-active low molecular weight initiators. The polyether polyols used are preferably ethylene oxide addition products; however, it is also possible to replace up to 50, preferably up to 35 % by weight of the ethylene oxide by propylene oxide or other alkylene oxides.

Polyether polyols to be used according to the invention and the preparation thereof are known in principle.

Suitable low-molecular weight initiator molecules for the preparation of the polyether polyols (A) to be used according to the invention are compounds which are known per se, for example water, ethylene glycol, propylene glycol, butanediol, trimethylolpropane, glycerol, triethanolamine, pentaerythritol, ethylenediamine, toluylenediamine, a very wide variety of sugars and the hydrogenation products thereof, formoses and formitols, aniline, polyalkylene polyamines, benzidines and the hydrogenation products thereof. Aliphatic and aromatic polycarboxylic acids are also possible initiators, also amino acids or amino alcohols, such as ethanolamine, or polyamines, such as ethylenediamine or diethylenetriamine. Halogen-containing initiators, such as brominated alcohols, such as bisbromomethylpropanediol, can also be used. In principle, polyethers other than those mentioned, for example polythioethers, polyacetals containing hydroxyether terminal groups, polycarbonates and polyester amides, as are known per se for the preparation of homogeneous and cellular polyurethanes, are also possible.

Sucrose polyethers, as described, for example, in German Published Specifications Nos. 1,176,358 and 1,064,938, and also polyethers initiated on formitol or formose (German Published Specifications Nos. 2,639,083 and 2,737,951 respectively), are also suitable initiators.

Representatives which may be mentioned as examples of polyester polyols to be used as component (B) are: polyesters which contain hydroxyl groups, have an OH number from 100 to 400 and are obtained by reaction of aliphatic, cycloaliphatic, araliphatic and aromatic polycarboxylic acids having 2 to 10 C atoms and containing at least two polyols from two different groups of the following three (a) hydroxyl compounds of molecular weight up to 200 which have more than three OH groups,
(b) hydroxyl compounds of molecular weight up to 150 which have three OH groups,
(c) hydroxyl compounds of molecular weight up to 110 which have two OH groups, with the proviso that one polyol must belong to group (a).

Possible polycarboxylic acids are, in particular, the carboxylic acids conventionally used for the preparation of polyester polyols; apart from benzenedicarboxylic acids, these are, in particular, aliphatic polycarboxylic acids having 3 to 10 C atoms.

Benzenedicarboxylic acids which may be mentioned are, for example, phthalic acid and terephthalic acid; preferred aliphatic polycarboxylic acids are, in particular, those having 3 to 8 C atoms, such as citric acid, tartaric acid, oxalic acid, maleic acid, fumaric acid and succinic acid. Due to the ready accessibility, adipic acid is preferred.

Possible hydroxyl compound of group (a) are sugar polyols, such as mannitol, sorbitol, xylitol and formitol; pentaerythritol is preferably used.

The preferred hydroxyl compound of group (b) is glycerol, but trimethylolpropane or triethanolamine, for example, are also possible.

A hydroxyl compound of group (c) which may preferably be mentioned, besides propylene glycol, various butanediols or neopentyl glycol, ethylene glycol.

According to the invention, highly branched polyesters made from adipic acid, pentaerythritol, glycerol and ethylene glycol are particularly preferably employed.

At 75° C., the polyesters have viscosities of about 300 to 8000 cP, but preferred viscosities are 400 to 5000 cP at 75° C. The acid numbers should be below 10, preferably between 0 and 5. The molecular weights are about 500 to 2000, preferably 600 to 1500, and the OH numbers are 100 to 400, preferably 120 to 300.

In principle, other conventional polyesters containing hydroxyl groups are also possible, for example products of the reaction of polyhydric, preferably dihydric and, if appropriate, additionally trihydric alcohols with polyvalent, preferably divalent carboxylic acids. In place of the free polycarboxylic acids, the corresponding polycarboxylic anhydrides or corresponding polycarboxylic esters of lower alcohols, or mixtures thereof, can also be used for the preparation of polyesters. The polycarboxylic acids may be of an aliphatic, cycloaliphatic, aromatic and/or heterocyclic nature and may be, if appropriate, substituted, for example by halogen atoms, and/or unsaturated.

Examples which may be mentioned of such carboxylic acids and derivatives thereof are:

Succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimerized and trimerized, unsaturated fatty acids, if appropriate mixed with monomeric, unsaturated fatty acids, such as oleic acid; dimethyl terephthalate and bis-glycol terephthalate. Suitable polyhydric alcohols are, for example, ethylene glycol, 1,2- and 1,3-propylene glycol, 1,4- and 2,3-butylene glycol, hexane-1,6-diol, octane-1,8-diol, neopentyl glycol, 1,4-bis-hydroxymethylcyclohexane, 2-methyl-propane-1,3-diol, glycerol, trimethylolpropene, hexane-1,2,6-triol, butane-1,2,4-triol, trimethylolethane, pentaerythritol, quinitol, mannitol and sorbitol, formitol, methyl glycoside, furthermore diethylene glycol, triethylene glycol, tetraethylene glycol and higher polypropylene glycols, and also dibutylene glycol and higher polybutylene glycols. The polyesters can contain terminal carboxyl groups proportionately. Polyesters made from lactones, for example $\epsilon$-caprolactone, or from hydroxycarboxylic acids, for example $\omega$-hydroxycaproic acid, can also be employed.

Representatives of the mentioned compounds (A) or (B) to be used according to the invention are described, for example, in High Polymers, Vol. XVI, "Polyurethanes, Chemistry and Technology", written by Saunders-Frisch, Interscience Publishers, New York, London, volume 1, 1962, pages 32–42 and pages 44–54, and volume III, 1964, pages 5–6 and 198–199, and also in Kunststoff-Handbuch [Plastics Handbook], volume VII, Vieweg-Höchtlen, Carl-Hanser-Verlag, Munich, 1966, for example on pages 45–71.

As components (A) and (B), mixtures of different polyether polyols or polyester polyols can also be used, so long as these mixtures have the required functionality and OH number.

Representatives which may be mentioned of component (C) are, for example, the products of the condensation of primary or secondary aliphatic, cycloaliphatic, aromatic, araliphatic or heterocyclic monoamines and/or polyamines with carbonyl compounds and dialkyl phosphites. Such condensation products may additionally, if appropriate, be oxyalkylated (see, for example, German Patent Specification No. 1,143,022, U.S. Pat. No. 3,076,010, DE-AS (German Published Specification) No. 1,803,747 and DE-AS (German Published Specification) No. 1,928,265).

The phosphorus-containing condensation products of the formula (1) are preferably employed.

The following are furthermore possible: other polyols containing phosphorus atoms, for example hydroxyl group-containing esters of phosphorus-containing acids, such as phosphoric acids of various degrees of condensation up to metaphosphoric acid, or of phosphonic acids, phosphinic acids or the alkoxylation products and/or reaction products thereof, salts of hydroxyl group-containing amines and various phosphoric acids, or amides of various phosphoric acids which contain hydroxyl groups.

Since it has been shown that, with reference to the shielding action when subjected to flames, the coating materials which give the best results are those which are the least porous, and porosity should theoretically be avoided, due to the possibility of allowing space for moisture inclusions, it is always expedient to work in moisture-free conditions when the production of the solidest possible coatings according to the invention is desired, not ones which may be porous or foamlike.

Since virtually all recipe components, such as polyols or fillers, contain adsorbed moisture or have a certain hygroscopicity, the presence of moisture must always be expected. It has therefore proven advantageous to add component D.

Representatives which may be mentioned of component (D) are, for example, dehydrated minerals, such as silica gels, gypsum or cements. However, the preferred desiccants employed are so-called zeolites in dehydrated form. The zeolites are preferably calcium-/aluminium silicates, which are capable of storing water in their lattice structure. However, those desiccants which bind water through chemical reaction, for example phosphorus pentoxide, tosyl isocyanates, carbides or acid anhydrides, may also be employed.

As component (E), aluminium hydroxide, aluminium oxide hydrates or partially-hydrated aluminium hydroxides are preferably used. However, other inorganic hydroxides or hydrates which release water under the influence of flames are also possible, for example boric acid and the partly-dehydrated derivatives thereof, furthermore $CaO.Al_2O_3.$ 10 $H_2O$ (nesquehonite), $MgCO_3.$ 3 $H_2O$ (wermlandite) $Ca_2Mg_{14}(Al,Fe)_4CO_3.(OH)_{42}.29H_2O$ (thaumasite), $Ca_3Si(OH)_6(SO_4)(CO_3).12$ $H_2O$ (artinite), $Mg_2(OH)_2CO_3.$ $H_2O$ (ettringite), 3 $CaO.Al_2O_3.3$ $CaSO_4.32$ $H_2O$ (hydromagnesite), $Mg_5(OH)_2.(CO_3)_4.4$ $H_2O$ (hydrocalumite), $Ca_4Al_2(OH)_{14}.6$ $H_2O$ (hydrotalkite), $Mg_6Al_2(OH)_{16}CO_3.4$ $H_2O$ alumohydrocalcite, $CaAl_2(OH)_4(CO)_2.3$ $H_2O$ scorbroite, $Al_{14}(CO_3)_3(OH)_{36}$ hydrogranate, 3 $CaO.Al_2O_3.6$ $H_2O$ dawsonite, $NaAl(OH)CO_3$, $CaSO_4.2$ $H_2O$ gypsum, water-containing zeolites, vermiculites, zinc borate, colemanite, perlites, mica, alkali metal silicates, borax, modified charcoals and graphites, and silicas.

As component (F), which the intumescent compositions according to the invention may contain as fillers in addition to components (A) to (E), the following may be mentioned, for example: aluminium oxide and oxides of boron, iron, zinc, charcoal, graphite, coke, calcium silicate, borates and phosphates or polyphosphates of Ca, Al, Zn, Mg and Fe, kaolin, chalk, glass in particular in bead, powder, flake or fibre form, ground minerals, wollastonite, dolomite, alumosilicates, gypsum, talc, asbestos, rock wool, cement, sawdust, metal powder or fibres, such as Pb; Al; Ag; Fe; Zn; and Cu; and nitrides and carbides of, for example, boron or tungsten.

The auxiliaries (F) can generally be natural or synthetic, inorganic or organic minerals which are solid, porous, hollow, crystalline, amorphous, pulverulent, flakelike, rodlike, spherical or fibrelike and may also contain, if appropriate, proportions of water of crystallization or hydration.

Possible auxiliaries (F), apart from the conventional fillers, are also flow agents, sedimentation inhibitors, thixotropic agents and flow modifiers. Finely divided, in particular pyrogenic silicas, carbon blacks or also calcium silicates, such as xonotlite, are particularly highly suitable.

The functions of component (F) may frequently also be taken over by components (D) and (E); this is the case, in particular, when components (D) and (E) are correspondingly intensely coloured, crystalline or meltable or finely divided desiccants or fillers.

Possible auxiliaries (F) are furthermore inorganic coloured pigments, such as, for example, iron oxide or titanium oxide pigments, metal-powder pigments, graphite and the like. Furthermore, surfactants, preservatives, light screens, antiweathering agents, fragrances, biocides, waterproofing agents, for example based on silicone or fluorinated hydrocarbons, and furthermore lubricants, such as Teflon powder or molybdenum sulphides, may be added as auxiliaries.

Compounds such as (poly)epoxides, as listed, for example, in DE-OS (German Published Specification) No. 3,303,702, solvents or flame retardants, such as conventional esters of phosphoric acid or of methyl- or phenylphosphoric acid, are also possible, if appropriate, although such additives are not essential for the subject matter of the invention.

Possible catalysts (G) are preferably those which, like tert. amines accelerate the reaction of isocyanate groups with the functional groups of components (A),(B) and (C). However, those catalysts which promote carbonification of the organic components of the intumescent compositions or reduce fume evolution can also be added. Such catalysts are, for example, donors of nonvolatile acids and/or compounds containing metals which easily change their valency, such as copper, manganese, titanium, vanadium, iron, cobalt, nickel, ruthenium, osmium, chromium, tungsten and uranium.

However, the catalysts used are preferably organometallic compounds, for example metal alkylcarboxylates of tin, lead or cerium, such as, for example, tin octoate or dibutyltin dilaurate, sodium acetate or potassium acetate, but also trimerization catalysts and carbodiimidization catalysts, such as phospholine oxides, alkali metal cage compounds and tertiary amines.

Suitable as component (H) are the isocyanates known from polyurethane chemistry. For example, aliphatic, cycloaliphatic, araliphatic, aromatic and heterocyclic polyisocyanates, as described, for example, by S. Siefken in Justus Liebigs Annalen der Chemie, 562, 75 to 136, in particular those of the formula (2)

$$Q (NCO)_m \qquad (2)$$

in which m represents a number from 2 to 4, preferably 2.0 to 3.0 and

Q represents an aliphatic hydrocarbon radical having 2 to 18, preferably 6 to 10, C atoms, a cycloaliphatic hydrocarbon radical having 4 to 15, preferably 6 to 13 C atoms or an araliphatic hydrocarbon radical having 8 to 15, preferably 8 to 13, C atoms, are suitable.

Examples of polyisocyanates of formula (2) are: ethylene diisocyanate, tetramethylene 1,4-diisocyanate, hexamethylene 1,6-diisocyanate, dodecane 1,12-diisocyanate, cyclobutane 1,3-diisocyanate, cyclohexane 1,3- and 1,4-diisocyanate, and any mixtures of these isomers, 1-isocyanato-3,3,5-trimethyl-5-isocyanatomethyl-cyclohexane (see DE-AS (German Published Specification) 1,202,785 and U.S. Pat. No. 3,401,190), hexahydrotoluylene 2,4- and 2,6-diisocyanate, and any mixtures of these isomers, hexahydrodiphenylmethane 1,3- and/or 4,4-diisocyanate, phenylene 1,3- and 1,4-diisocyanate, toluylene 2,4- and 2,6-diisocyanate, and any mixtures of these isomers, diphenylmethane 2,4- and/or 4,4-diisocyanate, and the polynuclear, higher-functional derivatives thereof, and naphthylene 1,5-diisocyanate.

The following are furthermore suitable, for example: triphenylmethane 1,4',4''-triisocyanate, polyphenyl polymethylene polyisocyanates, as obtained by aniline-formaldehyde condensation and subsequent phosgenation (see British Patent Specifications 874,430 and 848,671), m- and p-isocyanatophenylsulphonyl isocyanates (see U.S. Pat. No. 3,454,606), perchlorinated aryl polyisocyanates (see DE-AS (German Published Specification) No. 1,157,601 =U.S. Pat. No. 3,277,138), polyisocyanates containing carbodiimide groups (see German Patent Specification No. 1,092,007 =U.S. Pat. No. 3,152,162, DE-OS (German Published Specifications) Nos. 2,504,400, 2,537,685 and 2,552,250), norbornane diisocyanates (see U.S. Pat. No. 3,492,330), polyisocyanates containing allophanate groups (see British Patent Specification No. 994,890, German Patent Specification No. 761,626 and Dutch Patent Specification No. 7,102,524), polyisocyanates containing isocyanurate groups (see U.S. Pat. No. 3,001,973 and German Patent Specifications Nos. 1,022,789, 1,222,067 and 1,027,394 and DE-OS (German Published Specifications) Nos. 1,929,034 and 2,004,048), polyisocyanates containing urethane groups (see German Patent Specification No. 752,261 or U.S. Pat. Nos. 3,394,164 and 3,644,457), polyisocyanates containing acylated urea groups (see German Patent Specification No. 1,230,778), polyisocyanates containing biuret groups (see U.S. Pat. Nos. 3,124,605, 3,201,372 and 3,124,605 and British Patent Specification No. 889,050), polyisocyanates prepared by telomerization reactions (see U.S. Pat. No. 3,654,106), polyisocyanates containing ester groups (see British Patent Specifications Nos. 965,474 and 1,072,956, U.S. Pat. No. 3,567,763 and German Patent Specification No. 1,231,688), products of the reaction of the abovementioned isocyanates with acetals (see German Patent Specification No. 1,072,385) and polyisocyanates containing polymeric fatty acid esters (see U.S. Pat. No. 3,455,883).

It is also possible to employ, if appropriate dissolved in one or more of the abovementioned polyisocyanates, the distillation residues containing isocyanate groups which are produced in the industrial preparation of isocyanates. It is furthermore possible to use any mixtures of the abovementioned polyisocyanates. The industrially easily accessible polyisocyanates, for example toluylene 2,4- and 2,6-diisocyanate, and any mixtures of these isomers (="TDI"), in particular polyisocyanates of the MDI type, i.e. diphenylmethane 4,4- and/or 2,4-diisocyanate and/or polyphenyl polymethylene polyisocyanates, as prepared by aniline-formaldehyde condensation and subsequent phosgenation ("crude MDI"), and polyisocyanates containing carbodiimide groups, urethane groups, allophanate groups, isocyanurate groups, urea groups or biuret groups (=modified polyisocyanates), in particular those modified polyisocyanates which are derived from toluylene 2,4- and/or 2,6-diisocyanate or from diphenylmethane 4,4- and/or 2,4-diisocyanate, are preferred.

Monoisocyanates can be used proportionately, for example up to a maximum of 30 % by weight, relative to the weight of the polyisocyanate.

Component (H) is used in an amount from 70 to 130 mol %, relative to the amount which is stoichiometrically necessary for reaction of the active hydrogen atoms contained in components (A), (B) and (C). The polyisocyanate is preferably employed in an amount from 95 to 115 mol %, particularly preferably in an amount of about 100 mol %, relative to the amount which is stoichiometrically necessary for reaction of the active hydrogen atoms contained in components (A), (B) and (C). When less than the stoichiometrically necessary amount of polyisocyanate is used, the strength and water resistance of the intumescent compositions decrease to an increasing extent. If, in contrast, more than the stoichiometrically necessary amount of polyisocyanate is used, reactive intumescent compositions are obtained, which may be advantageous, for example, for crosslinking reactions, for example of the intumescent composition with the coated material or for a later curing reaction. If the component mixture A-G is to contain water, an amount of polyisocyanate which is equivalent to the amount of water should additionally be employed.

The intumescent compositions according to the invention are preferably solid or, at least, only have an insignificant porosity. Their density is in the range from 0.6 to 1.8, preferably in the range from 0.9 to 1.6 g/cm$^3$, particularly preferably 1.1 to 1.5 g/cm$^3$.

The hardening characteristic and "pot time" of the intumescent compositions and their physical properties, for example their viscosity, can be adjusted through choice of the amounts of catalyst, so that these compositions obtain, through rapid reaction at temperatures of about 0° and also at temperatures of, for example, 60° C., a viscosity such that they can still be applied to vertical walls in coating thicknesses of up to 30 mm or, with slower reaction, can still easily be introduced into open or closed moulds. Since the hardening times of the intumescent compositions according to the invention at room temperature can be adjusted, through choice of the components and the amounts in which these components are employed, so that they are in the range from several seconds to several minutes at room temperature, the compositions can be applied in one process in the form of a layer in virtually any thickness or can be processed in open or closed, heated or unheated moulds into moulded articles. At temperatures between 200° and 700° C., depending on the composition and the type of heating, they begin to expand, for example by 50 to 1000 % by volume. Their carbonification products produced under the influence of flames have a surprisingly high insulating capability and strength.

The intumescent compositions according to the invention can be used for the production of coatings and moulded articles, for example building elements. The invention therefore also relates to the use of the intumescent compositions according to the invention for the production of coatings and moulded articles which have a protective action against fire and heat, and to the coatings and coated substrates and moulded articles thus obtained.

Such coatings can be applied, for example, to sheets made from steel, aluminium, silicates, gypsum, wood or mineral wool, furthermore to walls, beams, pillars, panels, metal sheets, wire mesh, expanded metal or other substrates. The application can take place by spraying, brushing or pouring, if appropriate under a protective gas, such as, for example, nitrogen, argon or $CO_2$, if appropriate under moisture-excluding conditions (for example dry protective gas).

The moulded articles can be produced by casting the intumescent compositions according to the invention in open or closed moulds, if appropriate with supply of warm and cold auxiliary gases and/or heat. Building elements, in particular, can also be produced by mechanical processing of blanks or semifinished articles produced from the intumescent compositions according to the invention. Semi-finished articles can be, for example, solid blocks or sheets, foams, profiles or coatings from which final products are obtained, for example by cutting, compression moulding and stamping, but also by thermoforming, welding, coating or bonding. The moulded articles and semifinished articles are suitable, in particular, for use in ship-building, automobile manufacture, machine construction, building construction, refinery construction and underground engineering, in the construction of tunnels, multistorey buildings and chemical plants, and in electrotechnology. There is a considerable demand, in particular, where the occurrence of water (e.g. condensation, rainwater and ground water) and, in cases of fire, the occurrence of high temperatures, vigorous flame erosion and extinguishing water can be expected.

The intumescent compositions according to the invention are prepared by reacting component (H) with components (A) to (G), preferably present in the form of a preformulated mixture. The reaction is carried out at temperatures from $-10°$ to $+100°$ C., preferably $+10°$ to 45° C. The preparation can also be carried out by mixing all individual components or previously premixed combinations of individual components with one another, for example adding all or some of the pulverulent components to the liquid components, all of which or some of which are mixed together, or adding the catalyst, as an individual component, to the reaction mixture in a controlled fashion. The intumescent compositions according to the invention are preferably prepared in the form of the reaction mixtures immediately before use for coating or preparation of moulded articles.

By combining the intumescent compositions according to the invention with foamed or solid, inorganic or organic aggregates or coverings or bases, for example polystyrene foam, polyurethane foam, phenolics, aminoplastics or gravel, concrete, expanded clay, urea or phenolic resin foams, foamed glass, glass fibres, wood, mineral wool or pumice, composite materials having specific intumescent properties can be obtained. The production of coatings or building elements which are reinforced with fibres, wires, woven fabrics, ropes or nonwoven fabrics made from organic or inorganic materials, or the use thereof as components in multi-layer or sandwich constructions is likewise possible. The intumescent compositions according to the invention can also be used together with other intumescent compositions, specific protective effects being achievable through sandwich-like combination of intumescent materials or fire-retardant materials having differently graded effect characteristics.

The parts and percentages given in the following examples are parts by weight and per cent by weight respectively, unless otherwise stated.

The following components were used in the examples: Component A (polyether polyols): p1 (A1) glycerol-initiated ethylene oxide/propylene oxide polyether, OH number 251, content of propylene oxide units: 1.5 % by weight; functionality: about 3.

(A2) Sorbitol-initiated ethylene oxide polyether, OH number 300, functionality: about 5.

(A3) Ethylenediamine-initiated ethylene oxide/propylene oxide polyether, OH number 202, content of propylene oxide units: 9 % by weight, functionality: about 4.

Component B (polyester polyols):

(B1) Polyester made from 6 moles of adipic acid, 1 mole of pentaerythritol, 0.25 mole of glycerol and 5.25 moles of ethylene glycol; OH number 256, acid number 4.1, viscosity at 75° C.: 436 cP, functionality: about 4.

(B2) Polyester made from 1 mole of pentaerythritol, 6 moles of adipic acid, 0.3 mole of glycerol, 4.2 moles of ethylene glycol and 1 mole of neopentyl glycol; OH number 277, acid number 4.8, functionality: about 4.

Component C (phosphorus-containing polyols having at least 2 OH groups):

(C1) $(C_2H_5O-)_2PO-CH_2-N(-C_2H_4OH)_2$ (industrial product; P content: about 11.8 % by weight)

(C2) $(CH_3O-)_2PO-CH_2-N(-C_3H_7OH)_2$ (industrial product; P content: about 11.6 % by weight)

Component D (inert desiccants):

(D1) Dehydrated zeolite (Baylith T powder)

Component E (dehydratable fillers):

(E1) Technical aluminium hydroxide (filler quality; average grain size 20 to 25 μm; BET surface area 0.2 m²/g).

(E2) Hydrated gypsum which has been dried at 45° C. to constant weight (average grain size 45 pm, BET surface area 0.15 m²/g).

Component F (other inorganic fillers):

(F1) Pyrogenic silica (thixotropic agent)
(F2) Titanium dioxide white pigment
(F3) Technical oleylamine (surfactant)
(F4) Calcium carbonate (technical, filler quality)
(F5) Boron trioxide (technical, filler quality)
(F6) Zinc borate (technical, filler quality)
(F7) Calcium silicate (technical, filler quality, wollastonite)

Component G (catalysts):

(G1) Bis-8-dimethylamino-diethyl ether
(G2) Tin octoate
(G3) Dibutyltin dilaurate Component H (polyisocyanate):

(H1) 4,4'-Diisocyanato-diphenylmethane (technical mixture obtained by phosgenation of aniline-formaldehyde condensation products; NCO content 30 % by weight; ®Desmodur 44 V 40)

(H2) Technical toluylene diisocyanate (NCO content about 4 % by weight; Desmodur T 80)

General procedure for the preparation of the intumescent compositions used in the following examples:

Components A to G are mixed with one another at room temperature. The mixture is degassed for 10 minutes in a water-pump vacuum. Component H is then added to the mixture within 12 seconds with stirring.

The reaction mixture is used immediately for coating a freshly sand-blasted steel sheet or for the production of moulded articles. The exothermic reaction and the hardening of the intumescent composition is complete after about 15 minutes.

For experiments in the fire chamber, the freshly sand-blasted steel sheets (6 mm thick, dimensions 50×50 cm) are coated with the reaction mixture (coating thicknesses: 1 cm and 2 cm). The fire chamber used is a small fire chamber, in accordance with DIN 4102, into which the sheets to be tested are installed. The flame treatment is carried out so that the temperature in the fire chamber increases to 1000° C. within the first 10 minutes and evenly to about 1200° C. within the following 50 minutes and then remains approximately constant (approximate hydrocarbon fire conditions). The temperatures in the centre and near to the 4 corners on the side of the steel sheet facing away from the fire are measured. The measurements are taken after different flame-treatment times (30, 60, 90 and 120 minutes). From the 5 measurement results obtained for the individual flame-treatment times, an average temperature ($T_{min.}$), obtained for the respective flame-treatment time, is calculated.

In addition, the maximum height of the intumescent foam (IF) is measured on the removed sheets after the fire chamber has cooled.

In order to clarify the adverse effects of intumescent auxiliaries of the prior art, the following additives were tested in comparison:

Z1 — commercially available melamine pyrophosphate
Z2 — salt made from 1 mole of melamine and 0.75 mole of $H_3PO_4$
Z3 — neutral ethylenediamine phosphate
Z4 — secondary ammonium phosphate.

The compositions of the intumescent compositions described in Examples 1 to 18 and the fireproofing effect (temperatures on the side of the steel sheet facing away from the fire) achieved using these intumescent compositions and the height of the intumescent foam obtained are collated in Table 1 below.

TABLE 1

| Components [parts by wt.] | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| A1 | | | | | | 1000 | 1700 | 1700 | 1200 | 500 | 500 | 500 | 500 | 500 | | 300 | | |
| A2 | | | | | | | | | | | | | | | 500 | 200 | | |
| A3 | | | | | | | | | | | | | | | | | | |
| B1 | 500 | 500 | 500 | 1700 | 1700 | 700 | | | 500 | 1000 | 1000 | 1000 | 1000 | 1000 | | 700 | 1000 | 1000 |
| B2 | | | | | | | | | | | | | | | 1000 | 300 | | |
| C1 | 500 | 500 | 500 | 1700 | 1700 | 1700 | 1700 | 1700 | 1700 | 500 | 500 | 500 | | | 500 | 250 | 500 | 500 |
| C2 | | | | | | | | | | | | | 500 | 500 | | 250 | | |
| D1 | | | | 250 | 250 | 250 | 250 | 250 | 250 | 200 | 200 | 200 | 200 | 200 | 200 | 150 | 200 | 200 |
| E1 | 1000 | 1000 | 1000 | 3400 | 3400 | 3400 | 3400 | 3400 | 3400 | 2350 | 2350 | 2350 | 1880 | 1880 | 1700 | 1800 | 1850 | 1850 |
| E2 | | | | | | | | | | | | | | | | 250 | | |
| F1 | | | | | | | | | | 50 | 50 | 50 | 20 | 60 | 10 | 30 | 10 | |
| F2 | 30 | 30 | 30 | 102 | 102 | 100 | 100 | 100 | 100 | 100 | | | | | | | | |
| F3 | 20 | 20 | 20 | 68 | 68 | 50 | 50 | 50 | 50 | | | | | | 500 | | | 200 |
| F4 | | | | | | | | | | | | | | | 500 | | | 200 |
| F5 | | | | | | | | | | | | | 470 | 470 | | | | |

TABLE 1-continued

| Components [parts by wt.] | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| F6 | | | | | | | | | | | | | | | | 500 | | |
| F7 | | | | | | | | | | | | | | | | | 500 | 300 |
| G1 | | | | | | | | 5 | 5 | | | | | | | | | 5 |
| G2 | | | | | | | | | | | 5 | | | | 2 | | | |
| G3 | | | | | | | | | | | | | 5 | | | | | |
| Z1 | | | | 300 | | | | | | | | | | | | | | |
| Z2 | 150 | 75 | | | | | | | | | | | | | | | | |
| Z3 | | | | | | | | 300 | 300 | | | | | | | | | |
| Z4 | | | | | | 300 | | | | | | | | | | | | |
| H1 | 715 | 715 | 715 | 2380 | 2380 | 2380 | 2380 | 2380 | 2380 | 1620 | 1620 | 1620 | 1620 | 1000 | 1710 | 700 | 1620 | 1620 |
| H2 | | | | | | | | | | | | | | 397 | | 627 | | |
| T30 (°C.) | 140 | 123 | 119 | 85 | 105 | 121 | 101 | 125 | 118 | 85 | 160 | 160 | 161 | 158 | 160 | 141 | 152 | 160 |
| T60 | 485 | 410 | 300 | 111 | 171 | 198 | 115 | 200 | 181 | 110 | 165 | 240 | 170 | 165 | 170 | 158 | 120 | 160 |
| T90 | >500 | >500 | 348 | 111 | 300 | 240 | 125 | 390 | 320 | 135 | 240 | 315 | 260 | 240 | 230 | 230 | 250 | 260 |
| T120 | >500 | >500 | 358 | 170 | 405 | 362 | 210 | >500 | 430 | 150 | 285 | 385 | 328 | 350 | 350 | 350 | 280 | 300 |
| IF (cm) | 6 | 5 | 8 | 15 | 11 | 9 | 11 | 8 | 9 | 13 | 7 | 6 | 6 | 6 | 8 | 6 | 7 | 7 |

Explanatory notes on the data collated in Table 1:

CONCERNING EXAMPLES 1 to 3

The thickness of the intumescent composition coating is 2 cm. Since no desiccant (D) is used at the same time, the intumescent compositions have a certain porosity and the densities of the compositions are below 1 g/cm$^3$. Examples 1 and 2 correspond to intumescent compositions of the prior art, and Example 3 describes an intumescent composition according to the invention. From the data obtained in the fire chamber experiments, the improved fireproofing effect of the coating according to the invention can clearly be seen.

CONCERNING EXAMPLES 4 and 5

The thickness of the intumescent composition coating is 2 cm; as a consequence of the presence of the desiccant (D), virtually solid coatings having densities of greater than 1 g/cm$^3$ are obtained. Example 5 illustrates an intumescent composition belonging to the prior art, and Example 4 an intumescent composition according to the invention. From the results obtained in the fire chamber experiments, the improved fireproofing effect of the coating produced using the intumescent composition according to the invention can clearly be seen.

CONCERNING EXAMPLES 6 to 10

The thickness of the intumescent composition coating is 2 cm. Examples 6 to 10 show the importance of the combination, to be used according to the invention, of components A and B for the fireproofing effect of the intumescent compositions. In Examples 7 and 8, only one polyether polyol is used as P-free polyol for the preparation of the polyurethanes, whereas combinations of a polyester polyol and a polyether polyol are used in Examples 6, 9 and 10. In addition, Examples 6 and 9 show the effect of this combination of components A and B in intumescent compositions which contain conventional intumescent auxiliaries, and Examples 7, 8 and 10 show the effect of the combination, according to the invention, of components A and B in the propellent-free intumescent compositions according to the invention. From the results obtained in the fire experiments, it can clearly be seen that coatings which have a considerably improved fireproofing effect are obtained using the intumescent compositions according to the invention. From Examples 9 and 10, it can be seen how the excellent fireproofing effect of the coating obtained using the intumescent composition of Example 10 is impaired by addition of a small amount of a conventional intumescent auxiliary.

CONCERNING EXAMPLES 10 TO 12

Various activators G are used and, at the same time, the coating thicknesses of the coatings are reduced from 2 cm (Example 10) via 1 cm (Example 11) to 0.5 cm (Example 12). From the data obtained in the fire experiments, it can be seen that excellent fire protection is achieved even with coating thicknesses of only 0.5 cm.

Using the recipe-described in Example 11, the influence of the amount of activator on the pot time of the polyurethane prepared is, in addition, investigated in separate experiments. In these experiments, the percentage content of the activator, relative to the total weight of components A to G, is modified; the times are determined which pass at a temperature of the components of 20° C. (before mixing) after mixing the components for 10 seconds at room temperature until adhesion-free solidification of the intumescent compositions occurs. The result of these experiments is collated in Table 2 below.

TABLE 2

| Example 11 | (a) | (b) | (c) | (d) | (e) |
|---|---|---|---|---|---|
| % of G2 | 0.0 | 0.1 | 0.2 | 0.3 | 0.5 |
| Time (sec.) | 125 | 48 | 29 | 21 | 9 |

From Table 2, it can be seen that the reactivity of the batches, for example according to Example 10 to 12, can be increased so much that they can be sprayed onto a substrate using a multicomponent spray device and solidified there immediately after a short leveling time. This again means that protective coatings of any thickness can be applied to a substrate in one process through choice of the amount of activator.

The specific gravity of such coatings is about 1.3 g/cm$^3$. When introduced into a closed mould, specific gravities of 1.6 g/cm$^3$ can be achieved on the corresponding sheets or other moulded articles. The ball indentation hardness is 105 N/mm$^2$, and the notched impact strength 2.6 kJ/m$^2$.

If the activator-free intumescent composition is introduced into a mould which is heated to 80° C., the composition solidifies after about 2.5 minutes and can be released from the mould. In contrast, if the composition is introduced into a cooled (15 to 25° C.) mould, it can be released from the mould after about 3 minutes, and, although adhesion-free, is still flexible. The moulded article thus obtained can then be further moulded virtually as desired, for example into half split pipes or other profiles. If the moulds used for the further moulding or the resultant moulded articles are heated, the material which was previously still flexible solidifies within 1 to 15 minutes and is shape-stable even when heated. At 15° C. to room temperature, about 30 to 60 minutes pass until final hardening is complete. Thus, moulded articles and profiles, for example housing parts, whose fireproofing effect has been illustrated by Example 10 to 12 can be produced very easily.

CONCERNING EXAMPLES 13 and 14

The thickness of the intumescent composition coating in these examples is 1 cm; the coatings produced using intumescent compositions used in these examples exhibit a markedly stronger, mechanically more stable intumescent foam structure along with a good fireproofing effect.

CONCERNING EXAMPLES 15 to 19

The thickness of the intumescent composition coating in these examples is 1 cm. In these examples, it is investigated how far the use of different component types of the components to be used according to the invention influence the fireproofing effect of the intumescent compositions according to the invention. From the results obtained in the fire experiments, it can be seen that the excellent fireproofing effect of the intumescent compositions according to the invention is retained even when using a very wide variety of representatives of the components to be used according to the invention. In Examples 16 and 18, a relatively strong intumescent foam is obtained; this can be attributed to a certain ceramization of the filler F. This ceramization is a thoroughly desirable effect since it causes a particularly long fire-resistance duration and good oxidation and extinguishing-water resistance of the foam coating.

EXAMPLE 19

90 parts of chloro-fluoromethane are added to the mixture of components A to G according to Example 11 (b) before mixing with component H. The reaction mixture is forced into a closed aluminium mould, heated to 45° C., which is intended for the production of 2 cm thick sheets and which had been coated with a wax release agent, in a manner such that the mould was filled to about 70 %. The mould is opened after 15 minutes; it is now filled to 100 % and the moulded article has homogeneous, smooth coverings and has, in cross-section, a so-called integral structure, i.e. the coverings are essentially solid, and the core is slightly porous. The specific gravity of the sheet is about 1.0 g/cm$^3$. The fireproofing effect of this sheet corresponds approximately to the fireproofing effect of the coating prepared according to Example 11. Such panelling elements produced from an intumescent material having an integral structure can be used in aircraft construction or automobile manufacture.

EXAMPLE 20

The intumescent composition described in Example 13 is introduced into a tubular mould (internal diameter: 2 cm; wall thickness: 1.5 cm) made from silicone rubber. The tube removed from the mould after 10 minutes is used as a cable covering for an alternating-current cable. In order to investigate the fireproofing effect of this cable covering, the alternating-current cable protected by the cable covering is passed on a cable run made from fireclay plates diagonally through the small fire chamber used for the flame-treatment experiments described above. After flame-treatment of the cable covering for 60 minutes, the cable is still free of short circuits.

EXAMPLE 21

By means of a mobile multicomponent mixer head, in which the reaction mixture is atomized by means of compressed air, vertical sheets are sprayed at room temperature; the reaction mixture described in Example 11 (d) is used for the spraying. By swinging the spray beam up and down, the sheets, measuring about 80×80 cm, are covered with a coating of the intumescent composition which, although leveling adequately, does not drip off, but hardens rapidly.

The sheets provided in this fashion with a 1 cm thick coating comprised the following substrates:
2 mm steel sheet
3 cm mineral wool
1 cm plasterboard
2 mm aluminium
2 cm calcium silicate
5 cm wood wool/cement
1.8 cm wooden pressboard 50×50 cm sheets were cut out of the coated sheets and installed, with the coating towards the flame, in the small fire chamber described above and fired correspondingly to the standard temperature curve according to DIN 4102.

After an experiment duration of 60 minutes, rearside average temperatures of 150° C. were measured in the case of steel and aluminium, and rear-side average temperatures of below 100° C. in the case of all other substrates.

The sheet material accessible through the coating described above can be used for fireproof constructions. For example, the mineral wool or calcium silicate sheets coated with the intumescent compositions according to the invention have the long-term protective action at high flame temperatures caused by the coating with the intumescent compositions according to the invention, in addition to their known insulating action. In addition, the coating with the intumescent compositions according to the invention prevents moisture entering the insulating materials.

EXAMPLE 22

The fire experiment described in Example 20 is repeated using an alternating-current cable which had been covered directly with the reaction mixture used in Example 21 using the spraying technique described in Example 21. This cable was also free of short circuits after the action of fire for 60 minutes.

EXAMPLE 23

A first component is prepared by mixing (the numerical data are parts by weight)
100 of polyether polyol A1
200 of polyester polyol E2
100 of phosphorus-containing polyol C1
40 of desiccant D1
470 of filler E1
1.1 of silica F1 and
2.0 of catalyst G3.

1 kg/min of this first component, which has a viscosity of about 18,000 cP at 20° C., is supplied to a mixer head using agitating mixing technique. At the same time, a second component, comprising 0.53 kg/min of a hexamethylene diisocyanate (latter=Desmodur ® N from Bayer AG) which has been trimerized by reaction with small amounts of water, is supplied to the mixer head for mixing with the first component. The reaction mixture thus prepared is atomized directly behind the mixing chamber through a spray nozzle operating with 12 bar of compressed air, and is applied to freshly sandblasted steel sheets measuring 50×50×0.5 cm in a coating thickness of 1 cm. Since the reaction mixture hardens within about 20 seconds at 25° C., the desired coating thickness can be applied in one process.

A tough, hard coating is obtained and is tested as described in the small fire chamber. It turns out that an average temperature of 385° C. is reached after 120 minutes in these experiments on the side of the sheet facing away from the fire. This means that the use according to the invention of aliphatic polyisocyanates also leads to very usable coatings.

What is claimed is:

1. A propellant-free intumescent composition consisting essentially of product of the reaction of a phosphorus-containing and phosphorus-free polyol and a polyisocyanate, which is a reaction mixture, produced on mixing and reacting the following components:
   (A) 5 to 25% by weight, relative to the total weight of components A to G, o a polyether polyol containing at least 1.75 OH groups per molecule and having an OH number from 150 to 400;
   (B) 5 to 35% by weight, relative to the total weight of components A to G, of a polyester polyol containing at least 2OH groups per molecule and having an OH number from 120 to 400;
   (C) 5 to 25% by weight, relative to the total weight of components A to G, of a phosphorus-containing polyol containing at least two OH groups per molecule and having a phosphorus content between 6 and 21% by weight, with the proviso that the total weight of components A+B+C makes up 15 to 70% by weight of the total weight of the reaction mixtures;
   (D) 0 to 10% by weight, relative to the total weight of components A to G, of an inert desiccant;
   (E) 20 to 85% by weight, relative to the total weight of the reaction mixture, of a dehydratable filler;
   (F) 0 to 30% by weight, relative to the total weight of the reaction mixture, of other inorganic auxiliaries and fillers, with the proviso that the total weight of components D+E+F is 20 to 90% by weight relative to the total weight of the reaction mixture; and
   (G) 0 to 3% by weight, relative to the total weight of components A+B+C, of a catalyst; and
   (H) 70 to 130% b weight, relative to the amount which is stoichiometrically necessary for reaction of the active hydrogen atoms contained in the mixture of components A, B, and C, of a polyisocyanate.

2. Intumescent composition according to claim 1, which is a reaction mixture whose content of
   component (A) is 7 to 17% by weight,
   component (B) is 15 to 25% by weight,
   component (C) is 5 to 15% by weight and
   component (D) is 0.5 to 5% by weight, all % by weight being relative to the total weight of components A to G, and the total weight of components A+B+C makes up 30 to 45% by weight of the total weight of the reaction mixture; whose content of component (E) is 40 to 55% by weight and of component (F) is 0 to 12% by weight, both % by weight being relative to the total weight of the reaction mixture, and the total weight of components D+E+F makes up 45 to 70% by weight, relative to the total weight of the reaction mixture; whose content of component (G) is 0 to 1.5% by weight, relative to the total weight of components A+B+C, and of component (H) is 95 to 115% by weight, relative to the amount which is stoichiometrically necessary for reaction of the active hydrogen atoms contained in the mixture of components A, B and C.

3. A method for the production of a moulded article which has a protective action against fire and heat, which method comprises coating said article with a reaction mixture made from
   (A) 5 to 25% by weight, relative to the total weight of components A to G, of a polyether polyol containing at least 1.75 OH groups per molecule and having an OH number from 150 to 400;
   (B) 5 to 35% by weight, relative to the total weight of components A to G, of a polyester polyol containing at least 2OH groups per molecule and having an OH number from 150 to 400;
   (C) 5 to 25% by weight, relative to the total weight of components A to B, of a phosphorus-containing polyol containing at least two OH groups per molecule and having a phosphorus content between 6 and 21% by weight with the proviso that the total weight of components A+B+C makes up 15 to 70% by weight of the total weight of the reaction mixture;
   (D) 0 to 10% by weight, relative to the total weight of components A to G, of an inert desiccant;
   (E) 20 to 85% by weight, relative to the total weight of the reaction mixture, of a dehydratable filler;
   (F) 0 to 30% by weight, relative to the total weight of the reaction mixture, of other inorganic auxiliaries and fillers, with the proviso that the total weight of components D+E+F is 20 to 90% by weight relative to the total weight of the reaction mixture; and
   (G) 0 to 3% by weight, relative to the total weight of components A+B+C, of a catalyst; and
   (H) 70 to 130% by weight, relative to the amount which is stoichiometrically necessary for reaction of the active hydrogen atoms contained in the mixture of components A, B and C, of a polyisocyanate, in a mould.

4. A method according to claim 3 in which the reaction mixture has a content of
   component (A) from 7 to 17% by weight,
   component (B) from 15 to 25% by weight,
   component (C) from 5 to 15% by weight and
   component (D) from 0.5 to 5% by weight, all % weight being relative to the total weight of components A to G, and the total weight of components A+B+C makes up 30 to 45% by weight of the total weight of the reaction mixture; and which has content of component (E) from 40 to 55% by weight and of component (F) from 0 to 12% by weight, both % by weight being relative to the total weight of the reaction mixture, and the total weight of components D+E+F makes up 45 to 70% by weight, relative to the total of the reaction mixture; and which has a content of component (G) from 0 to 1.5% by weight, relative to the total weight of components A+B+C, and a component (H) from 95 to 115% by weight, relative to the amount which is stoichiometrically necessary for reaction of the active hydrogen atoms contained in the mixture of components A, B and C.

5. A method for the production of a coating which has a protective action against fire and heat, which method comprises spraying, brushing or pouring a reaction mixture made from
(A) 5 to 25% by weight, relative to the total weight of components A to G, of a polyether polyol containing at least 175 OH groups per molecule and having an OH number from 150 to 400;
(B) 5 to 35% by weight, relative to the total weight of components A to G, of a polyester polyol containing at least 2 OH groups per molecule and having an OH number from 150 to 400;
(C) 5 to 25% by weight, relative to the total weight of components A to G. of a phosphorus-containing polyol containing at least tow OH groups per molecule and having a phosphorus content between 6 and 21% by weight with the proviso that the total weight of components A+B+C makes up 15 to 70% by weight of the total weight of the reaction mixture;
(D) 0 to 10% by weight, relative to the total weight of components A to G, of an inert desiccant;
(E) 20 to 85% by weight, relative to the total weight of the reaction mixture, of a dehydratable filler;
(F) 0 to 30% by weight, relative to the total weight of the reaction mixture, of other inorganic auxiliaries and fillers, with the proviso that the total weight of components D+E+F is 20 to 90% by weight relative to the total weight of the reaction mixture; and
(G) 0 to 3% by weight, relative to the total weight of components A+B+C, of a catalyst; and
(H) 70 to 130% by weight, relative to the amount which is stoichiometrically necessary for reaction of the active hydrogen atoms contained in the mixture of components A, B and C, of a polyisocyanate, on a sheet mad ®from steel, aluminium, silicate, gypsum, wood or mineral wool.

6. A coating consisting essentially of the reaction mixture made from
(A) 5 to 25% by weight, relative to the total weight of components A to G, of a polyether polyol containing at least 1.75 OH groups per molecule and having an OH number from 150 to 400;
(B) 5 to 35% by weight, relative to the total weight of components A to G, of a polyester polyol containing at least 2OH groups per molecule and having an OH number from 150 to 400;
(C) 5 to 25% by weight, relative to the total weight of components A to G, of a phosphorus-containing polyol containing at least tow OH groups per molecule and having a phosphorus content between 6 and 21% by weight with the proviso that the total weight of components A+B+C makes up 15 to 70% by weight of the total weight of the reaction mixture;
(D) 0 to 10% by weight, relative to the total weight of components A to G, of an inert desiccant;
(E) 20 to 85% by weight, relative to the total weight of the reaction mixture, of a dehydratable filler;
(F) 0 to 30% by weight, relative to the total weight of the reaction mixture, of other inorganic auxiliaries and fillers, with the proviso that the total weight of components D+E+F is 20 to 90% by weight relative to the total weight of the reaction mixture; and
(G) 0 to 3% by weight, relative to the total weight of components A+B+C, of a catalyst; and
(H) 70 to 130% by weight, relative to the amount which is stoichiometrically necessary for reaction of the active hydrogen atoms contained in the mixture of components A, B and C, of a polyisocyanate.

7. A moulded article consisting essentially of the reaction mixture made from
(A) 5 to 25% by weight, relative to the total weight of components A to G, of a polyether polyol containing at least 1.75 OH groups per molecule and having an OH number from 150 to 400;
(B) 5 to 35% by weight, relative to the total weight of components A to G, of a polyester polyol containing at least 2 OH groups per molecule and having an OH number from 150 to 400;
(C) 5 to 25% by weight, relative to the total weight of components A to G, of a phosphorus-containing polyol containing at least tow OH groups per molecule and having a phosphorus content between 6 and 21% by weight with the proviso that the total weight of components A+B+C makes up 15 to 70% by weight of the total weight of the reaction mixture;
(D) 0 to 10% by weight, relative to the total weight of components A to G, of an inert desiccant;
(E) 20 to 85% by weight, relative to the total weight of the reaction mixture, of a dehydratable filler;
(F) 0 to 30% by weight, relative to the total weight of the reaction mixture, of other inorganic auxiliaries and fillers, with the proviso that the total weight of components D+E+F is 20 to 90% by weight relative to the total weight of the reaction mixture; and
(G) 0 to 3% by weight, relative to the total weight of components A+B+C, of a catalyst; and
(H) 70 to 130% by weight, relative to the amount which is stoichiometrically necessary for reaction of the active hydrogen atoms contained in the mixture of components A, B and C, of a polyisocyante, on a sheet made from steel, aluminium, silicate, gypsum, wood or mineral wool.

* * * * *

UNITED STATES PATENT AND TRADEMARK OFFICE
CERTIFICATE OF CORRECTION

PATENT NO. : 4,857,364
DATED : Aug. 15, 1989
INVENTOR(S) : von Bonin

It is certified that error appears in the above-identified patent and that said Letters Patent is hereby corrected as shown below:

Col. 10, line 67      Delete "pl"
Col. 19, line 13      Delete "175" and substitute --1.75--
Col. 19, line 43      Delete "mad®" and substitute --made Signed and Sealed this Nineteenth Day of February, 199

Attest:

HARRY F. MANBECK, JR.

*Attesting Officer*            Commissioner of Patents and Trademarks

UNITED STATES PATENT AND TRADEMARK OFFICE
CERTIFICATE OF CORRECTION

PATENT NO. : 4,857,364

DATED : 8/15/1989

INVENTOR(S) : Wulf von Bonin

It is certified that error appears in the above-identified patent and that said Letters Patent is hereby corrected as shown below:

On the title page, item [56] References Cited, under FOREIGN PATENT DOCUMENTS, replace "8/1986" by "4/87".

Signed and Sealed this

Fourth Day of August, 1992

Attest:

DOUGLAS B. COMER

*Attesting Officer*    Acting Commissioner of Patents and Trademarks